United States Patent
Berthoud

(10) Patent No.: US 10,926,863 B2
(45) Date of Patent: Feb. 23, 2021

(54) DEFLECTION MECHANISM OF THE FLAP PANELS OF AN AIRCRAFT

(71) Applicant: EMBRAER S.A., São José dos Campos-SP (BR)

(72) Inventor: Marcelo Berthoud, São José dos Campos-SP (BR)

(73) Assignee: EMBRAER S.A., São José dos Campos-SP (BR)

(*) Notice: Subject to any disclaimer, the term of this patent is extended or adjusted under 35 U.S.C. 154(b) by 703 days.

(21) Appl. No.: 15/689,252

(22) Filed: Aug. 29, 2017

(65) Prior Publication Data
US 2018/0065731 A1 Mar. 8, 2018

(30) Foreign Application Priority Data
Sep. 5, 2016 (BR) .......................... 102016020505-0

(51) Int. Cl.
*B64C 9/16* (2006.01)
*B64C 9/02* (2006.01)

(52) U.S. Cl.
CPC . *B64C 9/16* (2013.01); *B64C 9/02* (2013.01)

(58) Field of Classification Search
CPC .... B64C 9/02; B64C 9/16; B64C 9/04; B64C 9/06
See application file for complete search history.

(56) References Cited

U.S. PATENT DOCUMENTS

| 4,448,375 A * | 5/1984 | Herndon | B64C 9/16 244/216 |
| 8,657,053 B2 * | 2/2014 | Novikov-Kopp | B60V 1/08 180/117 |
| 2012/0091283 A1 * | 4/2012 | Uchida | B64C 9/02 244/213 |

* cited by examiner

*Primary Examiner* — Brian M O'Hara
(74) *Attorney, Agent, or Firm* — Nixon & Vanderhye P.C.

(57) ABSTRACT

Describes a deflection mechanism of the flap panels of an aircraft, the aforesaid deflection mechanism being connected to a wing of an aircraft by means of a first fixed structure and to the flap panels by linkage points, in order to support and deflect the flap panels in desired positions, the deflection mechanism of the flap panels of an aircraft comprises of a set of moving hinged links pivotally connected with each other and linked to a first fixed structure, and a hinged drive link connected to the flap panel and to a second fixed structure, the set of moving hinged links being linked to the flap panel by at least one linkage point in order to pivot jointly the moving hinged links deploying the flap panels in an initially predominantly rectilinear and subsequently deflected trajectory and at the same time aligned with a longitudinal direction of the aircraft, without the use of tracks and rollers, the hinged drive link being pivoted from the movement of the flap panels by the set of moving hinged links.

11 Claims, 5 Drawing Sheets

DEFLECTION MECHANISM OF THE FLAP PANELS OF AN AIRCRAFT

This application claims priority to BR Patent Application No. 102016020505-0 filed Sep. 5, 2016, the entire content of which is hereby incorporated by reference.

This invention refers to a deflection mechanism of the flap panels of an aircraft, particularly a mechanism of hinged links applied in the deflection of the flap panels of aircraft.

DESCRIPTION OF THE STATE OF THE ART

From the state of the art, countless mechanisms are known that allow for the activation and, more particularly, the deflection of the aerodynamic surfaces of an aircraft, preferably the surfaces of the flaps.

Flap mechanisms that use a fixed hinge line (exclusively rotary joint) for the deflection of the panels, have a kinematic restriction with respect to the capacity to translate the panels, which is an important and desirable characteristic to improve the aerodynamic performance of the panel flaps.

The translation of the flap panels, when seen from above, in the longitudinal direction of the aircraft is denominated a streamwise direction. There are other known solutions that allow for the combination of the streamwise and Fowler movements (those in which the panel tends to translate horizontally when deflected). However, this is achieved using components with tracks and rollers, elements that, although they allow for complex kinematic trajectories, are subject to excessive wear on their contact points, due to clearances, vibrations, deformations and thermal expansions. In order to mitigate this effect, in addition to a careful selection of the materials to be used, mechanical treatments are performed for the surface hardening of the tracks, such as in the application of tungsten carbide, which is very effective but highly expensive.

Document U.S. Pat. No. 4,448,375, in turn, describes a truss mechanism for the support and movement of the flaps in a wing section of an aircraft. This mechanism comprises of a four-bar linkage with the use of a "swing-link" and rotary actuators to perform the Fowler movement during the activation of the flap. It concerns a complex mechanism that is based on a concept with a high number of links to accomplish its functionality.

This constructive characteristic directly implies in an increase in the weight of the unit, mainly when considering the redundancies (duplications) that are needed to meet with the safety and certification requirements. It is a fact that the larger the number of elements of a system, the greater its failure rate, and consequently the lower its robustness and reliability. It is also a fact that the increase in the number of components and joints contributes directly to the increase in the existing clearances in the system and also to the increase of the sum total of tolerances (which translate into errors) of manufacture and assembly. Furthermore, it leads to a reduction in the rigidity of the unit when submitted to forces; this has a direct impact on the aerodynamic performance of the aircraft because it influences the positioning of the flap in relation to the wing and its dynamic behavior.

OBJECTIVES OF THE INVENTION

Therefore, this invention has an objective to provide a deflection mechanism of the flap panels of an aircraft, more specifically a mechanism of hinged links to deflect the flap surfaces of an aircraft.

It is also an objective of this invention to provide a deflection mechanism of the flap panels of an aircraft that moves these flap panels in the longitudinal direction of the aircraft (streamwise) at the same time as these flap panels describe a rectilinear trajectory before deflecting (Fowler) to a desired position, without the use of tracks and rollers.

BRIEF DESCRIPTION OF THE INVENTION

This invention has as an object, the deflection mechanism of the flap panels of an aircraft, the aforesaid deflection mechanism being connected to a wing of an aircraft by means of a first fixed structure and to the flap panels by linkage points), in order to support and deflect the flap panels in desired positions, the deflection mechanism of the flap panels of an aircraft being characterized by the fact that it comprises of a set of moving hinged links pivotally connected with each other and linked to a first fixed structure, and a hinged drive link connected to the flap panel and to a second fixed structure, the set of moving hinged links being linked to the flap panel by at least one linkage point in order to pivot jointly the moving hinged links deploying the flap panels in an initially rectilinear and subsequently deflected trajectory and at the same time aligned with a longitudinal direction of the aircraft, without the use of tracks and rollers, the hinged drive link being pivoted from the movement of the flap panels by the set of moving hinged links.

BRIEF DESCRIPTION OF THE DRAWINGS

This invention will now be described in more detail based on an example of execution represented in the drawings. The figures demonstrate.

DETAILED DESCRIPTION OF THE INVENTION

Figure 1:
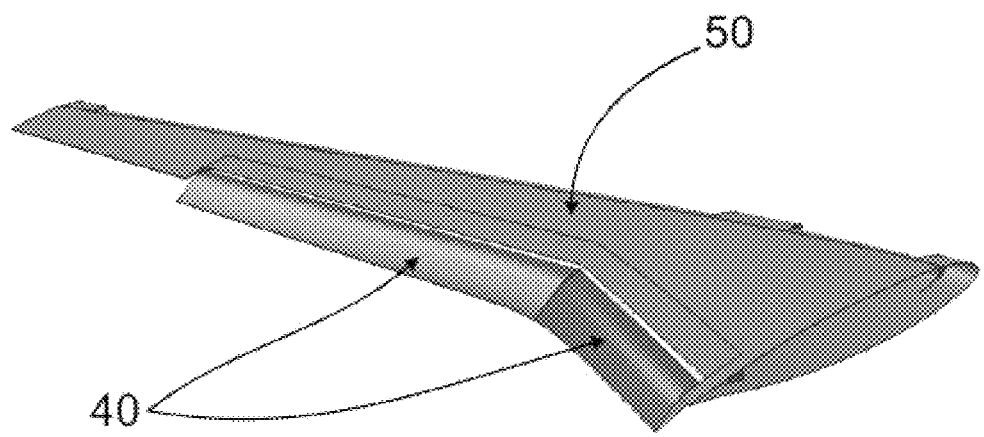
FIG. 1—is a schematic view of a wing of an aircraft containing the deflected flap panels.
Figure 2:
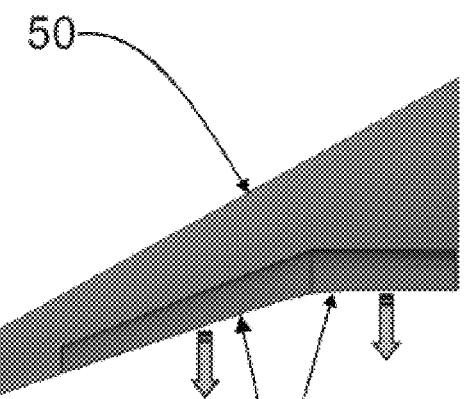
FIG. 2—is an exemplified view of the movement of the flap panels in the longitudinal direction of the aircraft (streamwise)
Figure 3:
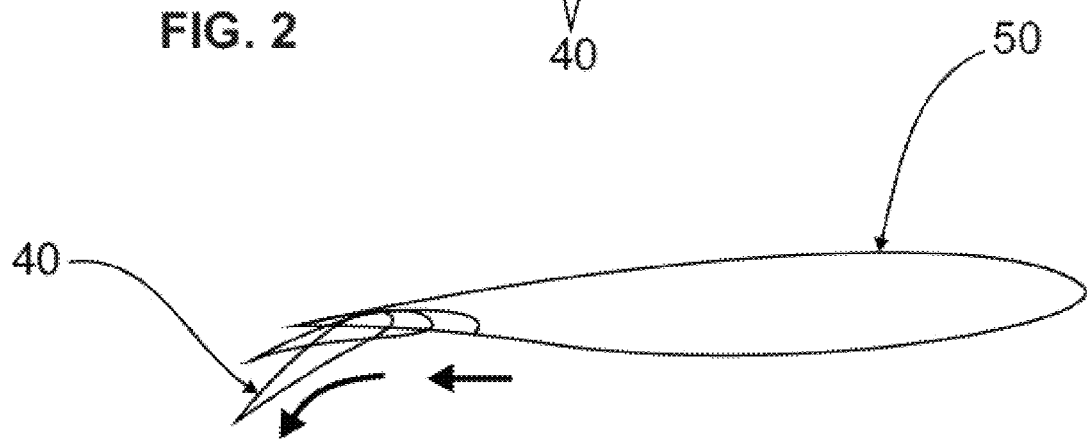
FIG. 3—is an exemplified view of the rectilinear trajectory and the deflection (Fowler) that the flap panels describe.

In accordance with a preferred embodiment and as can be seen in FIGS. 1 to 8B, the deflection mechanism 10 of the flap panels 40 of an aircraft, the object of this invention, has the function of moving the flap panels 40, located on the wings of the aircraft 50 (FIG. 1), in an initially predominantly rectilinear and subsequently deflected trajectory (Fowler movement) as illustrated in FIG. 3 and at the same time aligned with a longitudinal direction of the aircraft (streamwise movement) as illustrated in FIG. 2.

Figure 4:
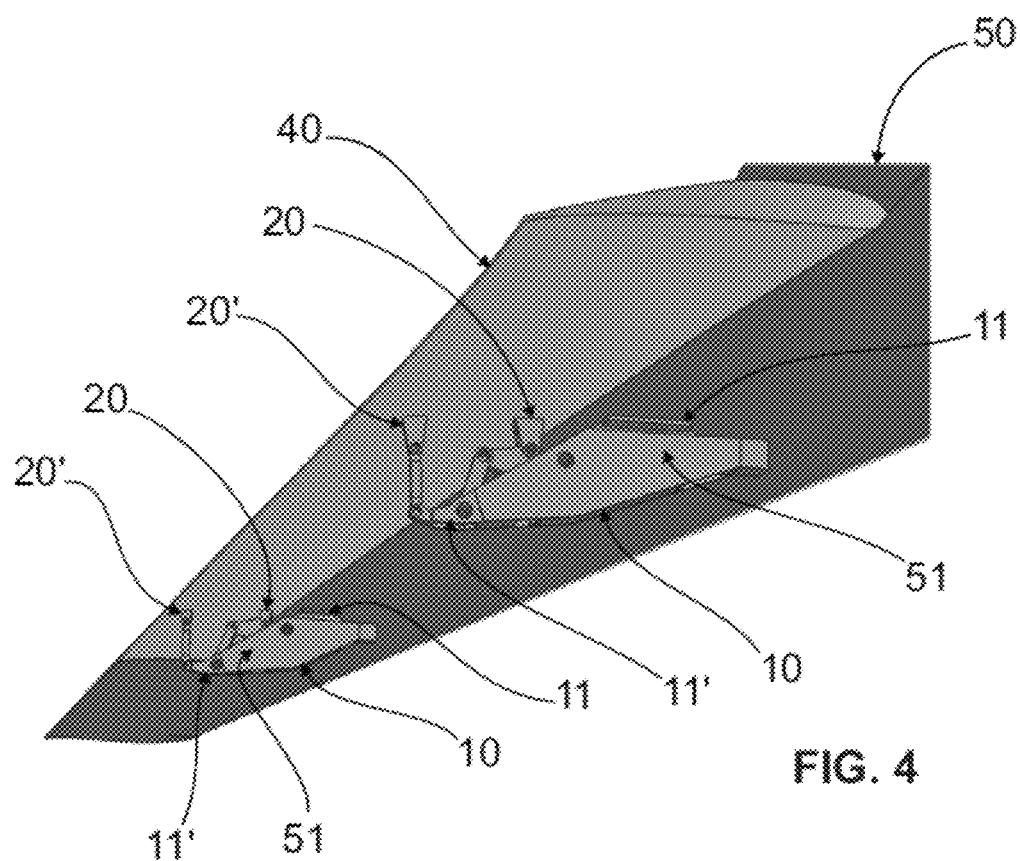
FIG. 4—is a schematic view of the deflection mechanism of the flap panels of an aircraft, the object of this invention, linked to the fuselage of the aircraft and to the flap panel to be moved.

To achieve this, as can be seen in FIG. 4, the deflection mechanism 10 is connected to a wing of an aircraft 50 by means of a first fixed structure 11 and to the flap panels 40 by linkage points 20, 20'. In this way, the deflection mechanism supports and deflects the flap panels 40 in the desired positions described above.

Figure 5:
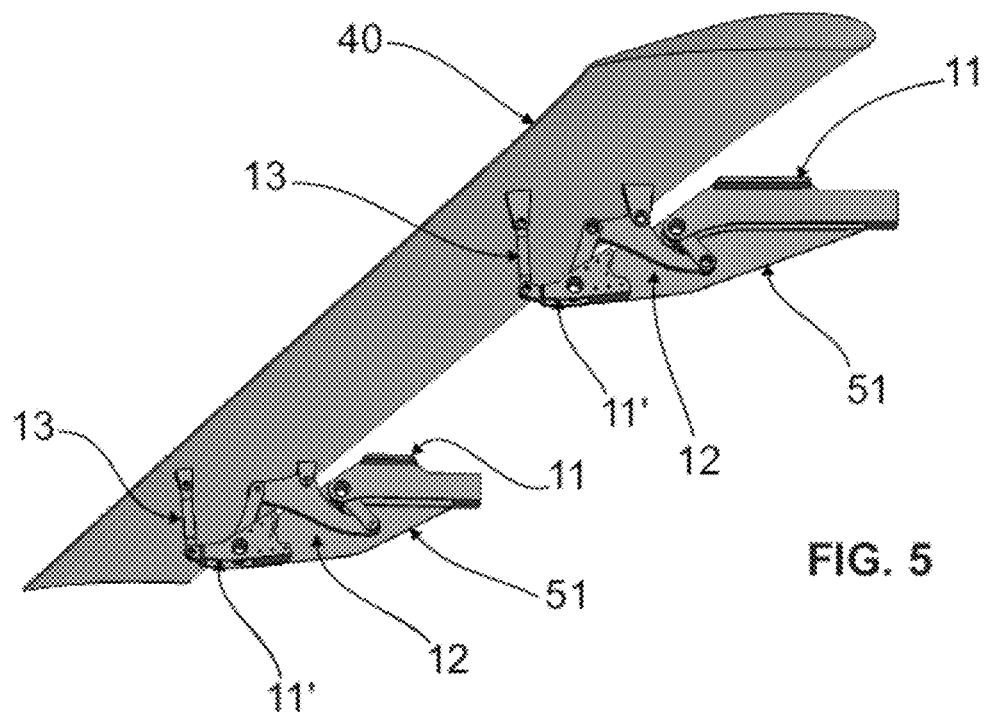
FIG. 5—is a schematic view of the deflection mechanism of the flap panels of an aircraft, the object of this invention, linked to a flap panel.

More specifically, and as can be seen in FIG. 5, the deflection mechanism 10 of the flap panels 40 of an aircraft comprises of a set of moving hinged links 12 pivotally connected with each other and linked to a first fixed structure 11 and a hinged drive link 13 connected to the flap panel 40 and to a second fixed structure 11'.

Figure 6A:
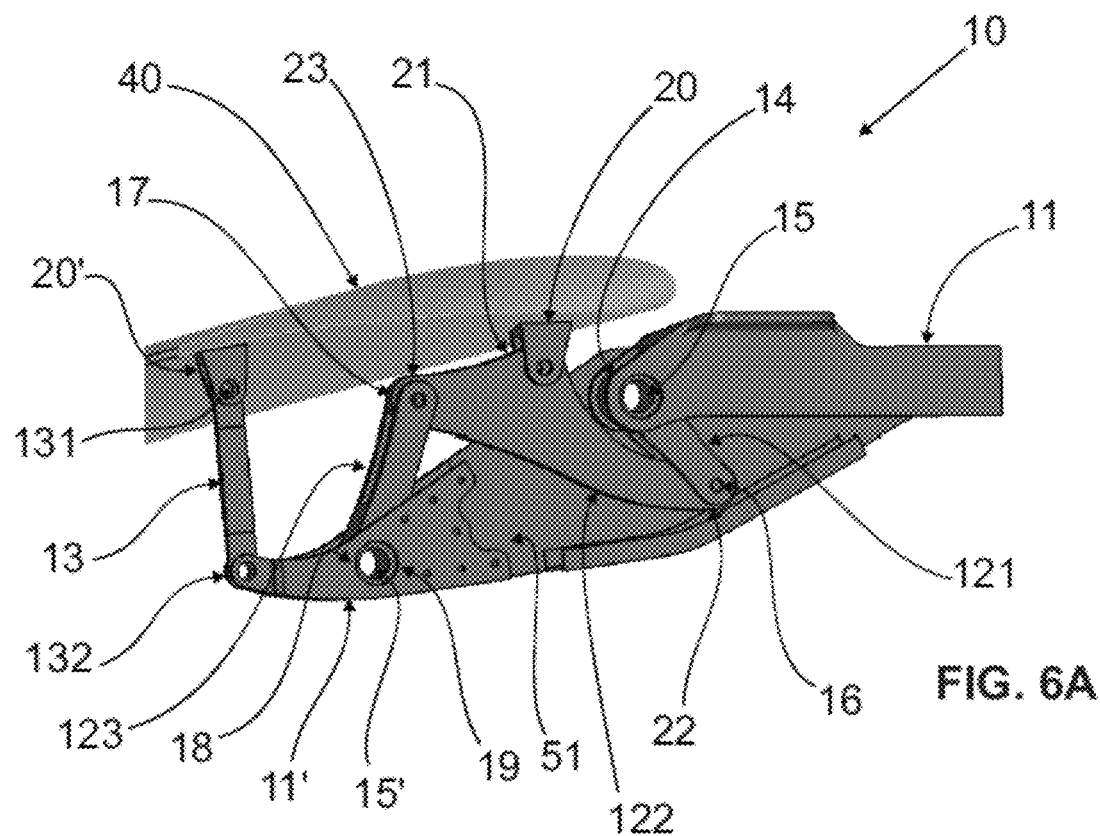
FIG. 6A is a view of the deflection mechanism of the flap panels of an aircraft, the object of this invention, when the flap panel linked to it is in the retracted position.
Figure 6B:
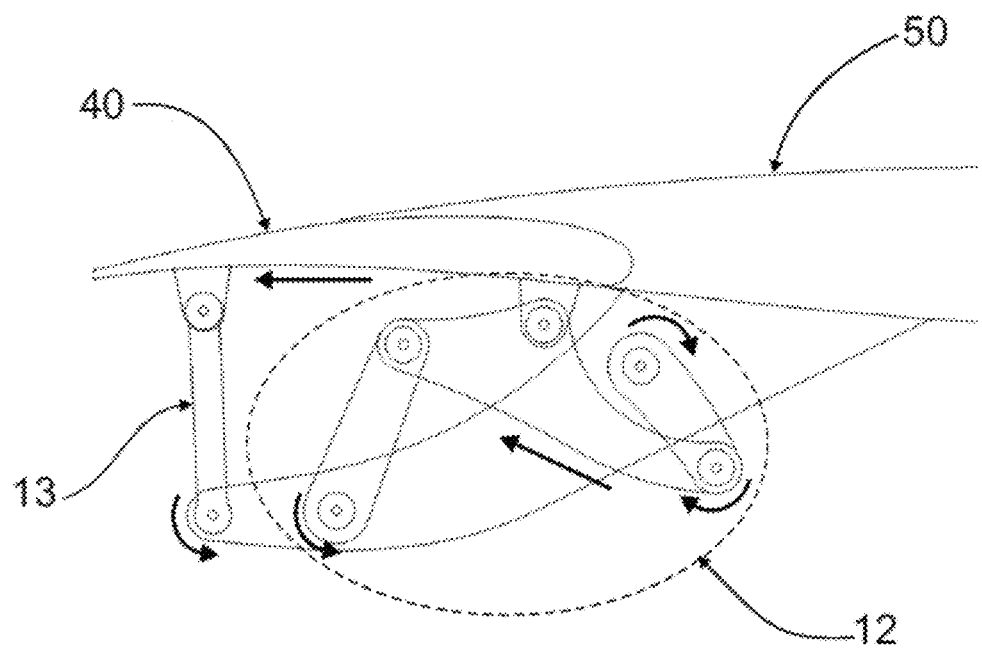
FIG. 6B—is a schematic view of the deflection mechanism of the flap panels of an aircraft, the object of this invention, when the flap panel linked to it is in the retracted position illustrated in FIG. 6A.
Figure 7A:
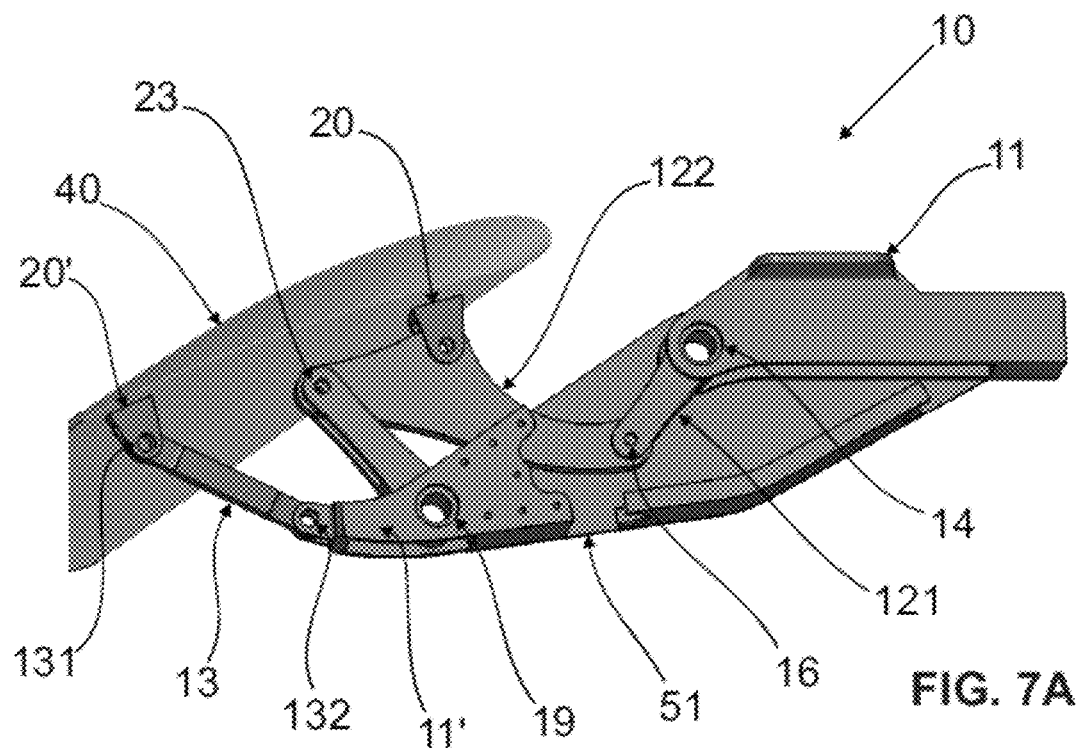
FIG. 7A is a view of the deflection mechanism of the flap panels of an aircraft, the object of this invention, when the flap panel linked to it is in the intermediary position.
Figure 7B:
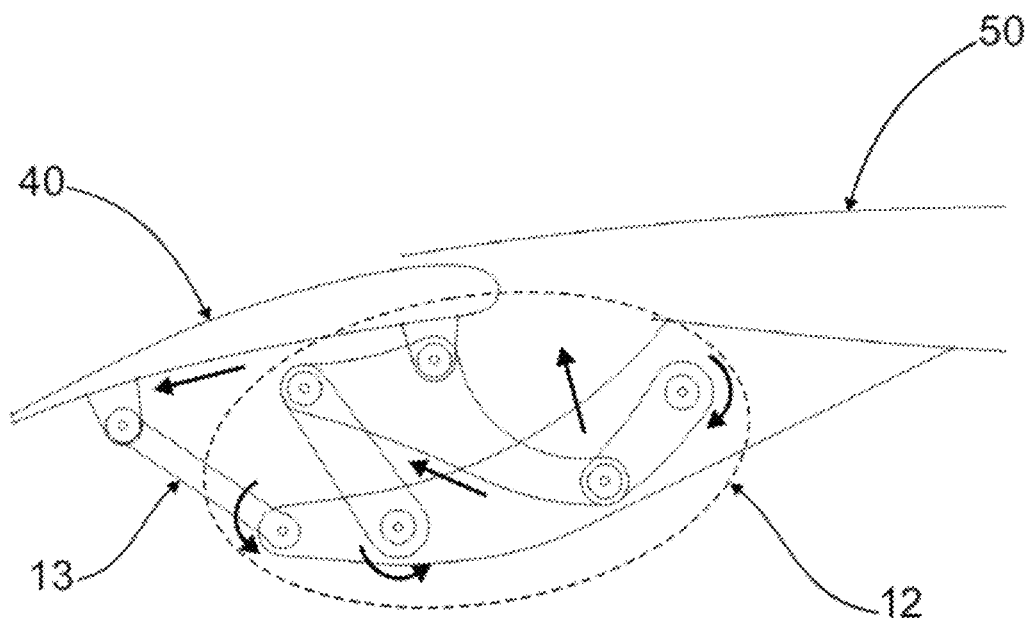
FIG. 7B—is a schematic view of the deflection mechanism of the flap panels of an aircraft, the object of this invention, when the flap panel linked to it is in the intermediary position illustrated in FIG. 7A.
Figure 8A:
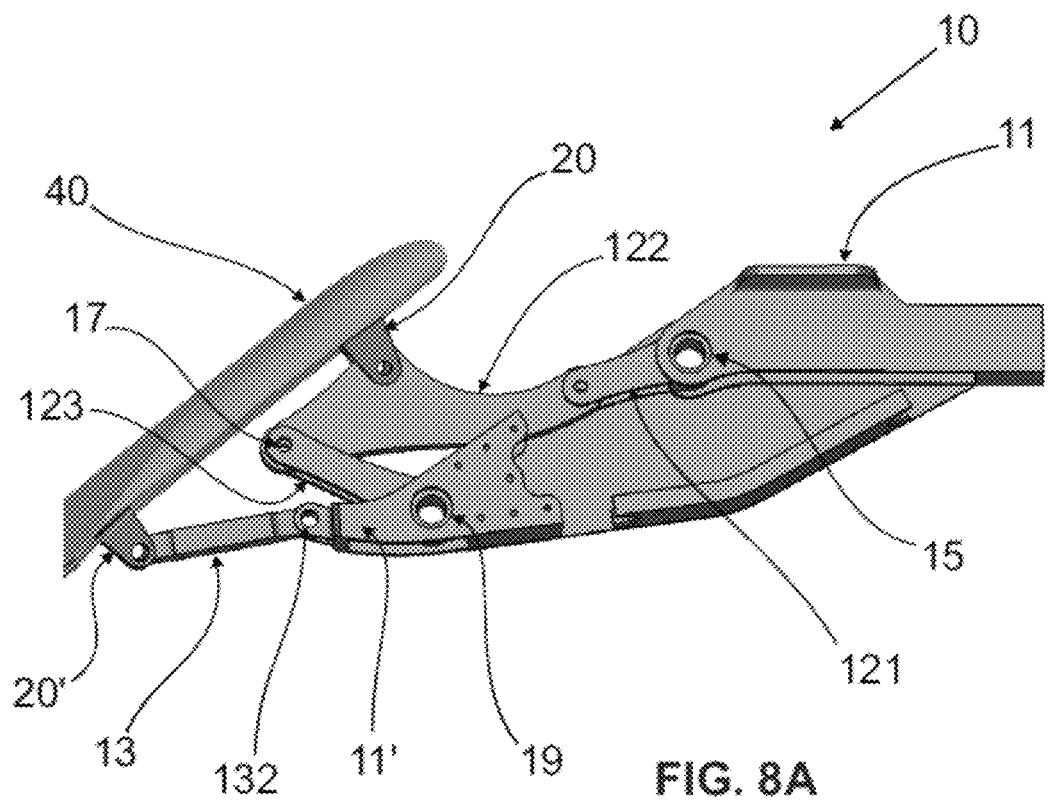
FIG. 8A is a view of the deflection mechanism of the flap panels of an aircraft, the object of this invention, when the flap panel linked to it is in the position of maximum deflection.
Figure 8B:
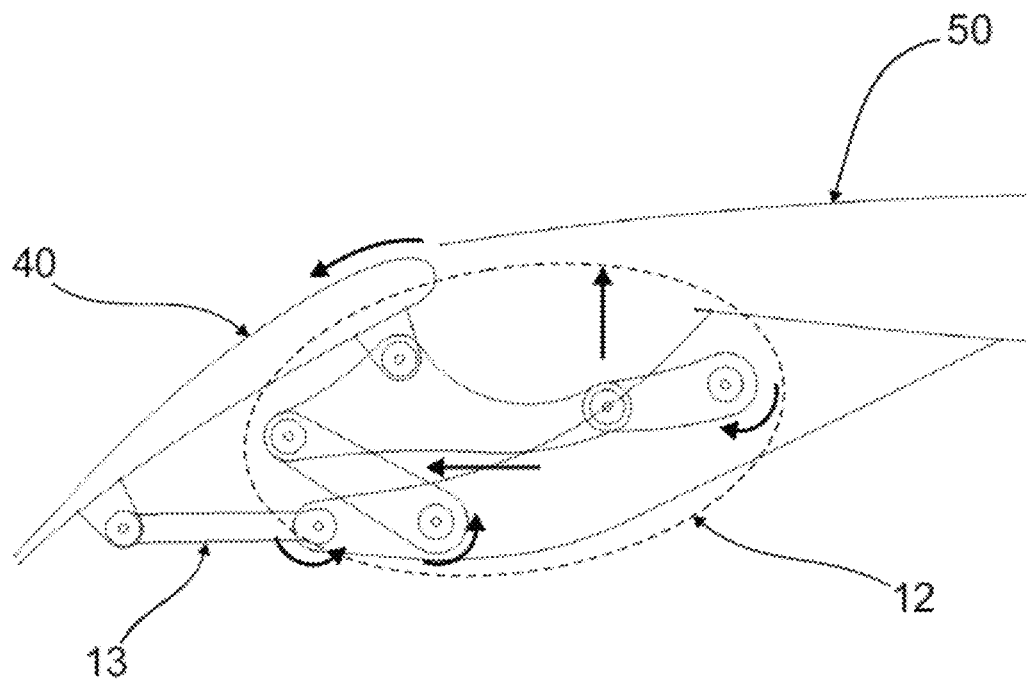
FIG. 8B—is a schematic view of the mechanism of the flap panels of an aircraft, the object of this invention, when the flap panel linked to it is in the position of maximum deflection illustrated in FIG. 8A.

FIGS. 6A, 6B, 7A, 7B, 8A and 8B illustrate the deflection mechanism 10 deploying a flap panel 40. FIGS. 6A and 6B illustrate the flap panel 40 in the retracted position in the wing of the aircraft 50, FIGS. 7A and 7B illustrate the flap panel 40 in the intermediary position and FIGS. 8A and 8B illustrate the flap panel 40 in the position of maximum deflection. In all these positions, the components of the deflection mechanism 10 that will be next described in more detail are the same, only the positions of the hinged links change to modify the position of the flap panel 40 in accordance with the requirements of the aircraft.

Therefore, considering FIGS. 6A to 8B, the set of moving hinged links 12 is linked to the flap panel 40 by at least one forward linkage point 20 in order to pivot, jointly, the moving hinged links 12 deploying the flap panels 40 in an initially rectilinear and subsequently deflected trajectory and at the same time aligned with a longitudinal direction of the aircraft.

This set of moving hinged links 12 is formed by an actuating hinged link 121 linked by a hinge to a first fixed structure 11 and a central hinged link 122, and a driving hinged link 123 linked by a hinge to a central hinged link 122 and to a second fixed structure 11'.

The actuating hinged link 121 is formed by parallel links connected at their extremities by hinges, the first hinge 14 is a forked hinge formed by an extremity of the actuating hinged link 121 and an extremity of the first fixed structure 11, containing a pin 15. The second hinge 16 is a pivot at the extremity of the actuating hinged link 121 opposite to the first hinge 14, in which the actuating hinged link 121 is hinged to a central hinged link 122.

The driving hinged link 123 is also formed by parallel links connected at their extremities by hinges, the third hinge 17 is a pivot at the extremity of the driving hinged link 123 in which the driving hinged link 123 is linked to a central hinged link 122, while the fourth hinge 18 is a fork hinge formed by the extremity of the driving hinged link 123 opposite to the extremity pivoted to a central hinged link 122 and a hinge point 19 of the second fixed structure 11'. This fourth hinge 18 contains a pin 15'.

The central hinged link 122 has a solid body, with a substantially triangular shape in order that a first vertex 21 is hinged with a linkage point 20' located in the flap panel 40, a second vertex 22 is hinged with the actuating hinge link 121 and a third vertex 23 is hinged with the driving hinged link 123.

The deflection mechanism 10 also comprises of a hinged drive link 13 that is independent from the set of moving hinged links 12, but that is pivoted from the movement of the flap panels 40 by the set of moving hinged links 12.

This hinged drive link 13 is a single link containing a first extremity 131 linked by a hinge to the flap panel 40 by at least one aft linkage point 20' located in line with the forward linkage point 20 linked to a central hinged link 122 of the set of hinged links 12, and a second extremity 132 linked by a hinge to a second fixed structure 11', aligned with a hinge of the driving hinged link 123 with the second fixed structure 11'.

FIGS. 6A and 6B illustrate the positioning of the deflection mechanism 10 when the flap panel 40 linked to it is in the retracted position, which is inside its housing in the wing of the aircraft 50. In this position, the central hinged link 122 is next to the first fixed structure 11 and the hinged drive link 13 is substantially perpendicular to the flap panel 40.

The actuating hinged link 121 is linked to an actuator (not illustrated), which can be a rotary or linear actuator, in order that, when the flap panel 40 needs to be deployed, the actuating hinged link 121 is rotated in a clockwise direction in response to a command from the actuator, deploying rectilinearly the central hinged link 122 distancing it from the first fixed structure 11, at the same time in which the driving hinged link 123 is rotated in an anti-clockwise direction around its hinge with the second fixed structure 11'. By being deployed rectilinearly, the central hinged link 122 deploys, also rectilinearly, the flap panel 40 which, in turn, transfers movement to a hinged drive link 13 that is rotated around its hinge with the second fixed structure 11'.

This deployment takes the flap panel 40 to the intermediary position illustrated in FIGS. 7A and 7B. In this position, the central hinged link 122 is pushed away from the first fixed structure 11 and the hinged drive link 13 is no longer substantially perpendicular to the flap panel 40.

Following commands, the actuator (not illustrated) continues to rotate the actuating hinged link 121 in a clockwise direction continuing the rectilinear deployment of the central hinged link 122 and of the flap panel 40, until the second hinge 16 elevates the second vertex of the central hinged link 122, promoting, thereby, the deflection of the flap panel 40 in an anti-clockwise direction due to the rotation of the hinged drive link 13 around its hinge with the second fixed structure 11'.

In this position, as illustrated in FIGS. 8A and 8B, the flap panel 40 is in the position of maximum deflection and the Fowler and Streamwise movements have already been realized. This maximum deflection is usually achieved during the landing procedures of the aircraft.

The deflection mechanism 10 also comprises of a pair of protector panels 51 parallel with each other and located laterally to the mechanism, that is, laterally to the hinged links with the objective of protecting them and also to provide a greater rigidity to the mechanism. The protector panels 51 are fixed to the first and second fixed structures 11, 11' and follow the outline of the lateral surfaces of this deflection mechanism 10.

An aircraft containing at least one deflection mechanism 10 of the flap panels 40 and preferably two deflection mechanisms 10 by flap panels 40 is also an object of this invention. The aforesaid deflection mechanisms 10 being fixed on the lower section of the flap panels 40 and linked also to the lower section of the fuselage of the aircraft 50.

An example of the preferred embodiment having been described, it should be understood that the scope of this invention has other possible variations, being limited only by the content of the attached claims, with the possible equivalents included therein.

The invention claimed is:

1. A deflection mechanism connectable between a wing of an aircraft and a flap panel associated with the wing capable of deployment between a stowed condition where the flap panel is substantially aligned with the wing and a deployed condition where the flap panel is deflected relative to the wing, wherein the deflection mechanism comprises:
first and second fixed structures adapted to be fixed to the wing of the aircraft;
forward and aft linkage points longitudinally aligned with one another relative to a longitudinal axis of the aircraft and fixed to an underside of the flap panel; and
a movable hinged linkage assembly hingedly coupling the forward and aft pivot points of the flap panel to the first and second fixed structures in order to support and deflect the flap panels during movement between the stowed and deployed conditions, wherein
the movable hinged linkage assembly comprises:
(i) a set of movable hinged links pivotally connected to one another and pivotally linking the forward linkage point of the flap panel to the first and second fixed structures, and
(ii) a hinged drive link positioned aft of the set of movable hinged links, wherein the hinged drive link has one end which is pivotally linked to the aft linkage point of the flap panel and an opposite end which is pivotally linked to a terminal end of the second fixed structure, and wherein the hinged drive link is capable of being pivoted in response to movement of the flap panel between the stowed and deployed conditions by the set of movable hinged links, and wherein
the movable hinged linkage assembly pivotally links the flap panel to the wing through the first and second fixed structures to allow deployment of the flap panel between the stowed and deployed conditions in an initially predominantly rectilinear trajectory and then a subsequently deflected trajectory while simultaneously remaining aligned with the longitudinal direction of the aircraft.

2. The deflection mechanism according to claim 1, wherein the hinged drive link is independent from the set of movable hinged links.

3. The deflection mechanism according to claim 1, wherein the set of movable hinged links comprises:
a central hinged link,
an actuating hinged link which is pivotally linked to the first fixed structure and to the central hinged link, and
a driving hinged link which is pivotally linked to the central hinged link and to the second fixed structure.

4. The deflection mechanism according to claim 3, wherein the actuating hinged link is connectable to an actuator so as to be pivotal in a first pivot direction in response to a command from the actuator.

5. The deflection mechanism according to claim 3, wherein the set of movable hinged links is linked to the flap panel by a first vertex of the central hinged link which is connected to the forward linkage point.

6. The deflection mechanism according to claim 5, wherein the aft linkage point of the flap panel is aligned with the forward linkage point which is linked to the first vertex of the central hinged link of the set of movable hinged links.

7. The deflection mechanism according to claim 1, which further comprises of a pair of protector panels fixed to the first and second fixed structures, the protector panels being positioned parallel relative to one another and located laterally relative to the set of movable hinged links.

8. The deflection mechanism according to claim 3, wherein the central hinged link comprises first, second and third vertexes, and wherein
the first vertex pivotally links the central hinged link to the forward linkage point,
the second vertex pivotally links the central hinged link to one end of the actuating hinged link, and
the third vertex pivotally links the central hinged link to one end of the driving hinged link.

9. The deflection mechanism according to claim 8, wherein the driving hinged link includes another end opposite to the one end thereof that is pivotally linked to the second fixed structure forwarding of the hinged drive link.

10. The deflection mechanism according to claim 9, wherein the actuating hinged link includes another end opposite to the one end thereof that is pivotally linked to the first fixed structure forwardly of the driving hinged link.

11. An aircraft which comprises a wing, a flap panel associated with the wing, and the deflection mechanism according to claim 1 operably interconnecting the flap panel and the wing.

* * * * *